United States Patent [19]

O'Lenick, Jr.

[11] Patent Number: 4,937,277

[45] Date of Patent: Jun. 26, 1990

[54] ALKOXYLATED SILICON POLYMERS

[75] Inventor: Anthony J. O'Lenick, Jr., Lilburn, Ga.

[73] Assignee: Rhone-Poulenc Specialty Chemicals, L.P., Princeton, N.J.

[21] Appl. No.: 194,259

[22] Filed: May 16, 1988

[51] Int. Cl.$^5$ .............................................. C08K 5/11
[52] U.S. Cl. .................................. 524/318; 524/588; 528/26; 528/29; 528/33; 556/437
[58] Field of Search ........................... 528/26, 29, 33; 556/437; 524/318, 588

[56] References Cited

U.S. PATENT DOCUMENTS 4,681,922  7/1987  Schmidt et al. ...................... 528/29
4,699,967  10/1987  Eichenauer et al. ................ 528/29

Primary Examiner—Melvyn I. Marquis

Attorney, Agent, or Firm—M. J. Maue; P. J. Juettner

[57] ABSTRACT

The present invention relates to novel silicone containing block polyesters useful as soil release and antistatic agents prepared by the reaction of a silicone compound having the following structure

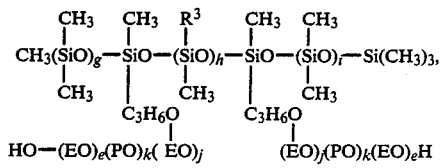

as defined herein, a polyalkylene glycol and a benzene polycarboxylic acid ester or anhydride thereof.

15 Claims, No Drawings

ALKOXYLATED SILICON POLYMERS

BACKGROUND OF THE INVENTION

Many soil release agents have been developed for synthetic fibers and fabrics, e.g. the copolymers of ethylene glycol and terephthalic acid as in Dacron, Fortrel, Kodel and Blue C Polyester. The hydrophobicity of these polyesters makes them difficult to launder, particularly when heavily soiled with oil or grease deposits which preferentially wet the fabric as opposed to entering the aqueous laundering medium.

Among the leading soil release agents developed for laundering purposes are the polyesters exemplified in U.S. Pat. Nos. 3,962,152; 3,416,952; 4,132,680; 4,201,824; 4,423,557; 4,349,688; 3,959,230; 3,893,929; 3,712,873; and 4,116,885. Generally these agents are polymers containing polyester and terephthalate and/or urethane groups to improve water compatability. However, all of these soil release agents have a common failing in that they possess no softening properties. Accordingly, separate compounds must be incorporated in their formulations or added to the washing or rinsing cycle when hand modification is required. Additionally such soil release agents, because of their polyester substantivity, have a tendency to build up on the fabric after several washings. This build up of soil release residue often lead to yellowing of the textile substrates.

Accordingly it is an object of this invention to overcome the above deficiencies by economical and commercially feasible means.

Another object is to impart soil release, softening and antistatic properties to a fiber or fabric by the use of a single compound.

Another object is to simplify the formulation of laundering compositions and to minimize residue build-up.

Still another object is to provide novel compounds which can be synthesized by an economical process.

These and other objects of the invention will become apparent from the following description and disclosure.

THE INVENTION

The compounds of this invention are silicone polyester polyols containing units of
(a) alkylene oxide, —CH$_2$—CH(X)—O—
(b) terephthalate,

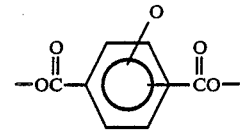

and
(c) siloxane,

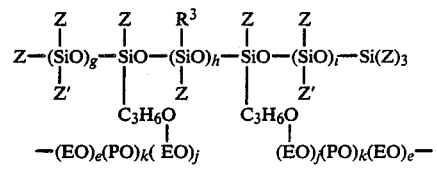

wherein
X is H or CH$_3$;
Q is H, —SO$_3$M, —COOH or —COOM where M is sodium, potassium or ammonium;
Z and Z' are each —CH$_3$, or —C$_{2l}$H$_5$ or mixtures thereof;
R$^3$ is Z or —C$_3$H$_6$O(EO)$_j$(PO)$_k$(EO)$_e$H or mixtures thereof when h is greater than one;
EO is ethyleneoxide;
PO is propylene oxide;
g has a value of from 1 to 150, preferably from 5 to 100;
h has a value of from 0 to 100, preferably from 5 to 50;
i has a value of from 0 to 100, preferably from 0 to 10;
j has a value of from 0 to 100, preferably from 1 to 50;
k has a value of from 0 to 50, preferably from 0 to 25 and
e has a value of from 0 to 100, preferably from 0 to 50.

The compounds of this invention generally contain between about 3 and about 425 units of component (a); between about 1 and about 40 units of component (b) and between about 1 and about 12 units of component (c). Of these, the compounds wherein Z and Z' are both methyl and wherein component (a) represents from 3 to 400 units; component (b) represents from 3 to 25 units and component (c) represents from 1 to 10 units, are preferred and those having from 100 to 200 units of component (a); 15 to 20 units of component (b) and 3 to 5 units of component (c) are most preferred. The compounds can be employed individually or can be used as intermixtures.

The following formulae are illustrative of the present compound.

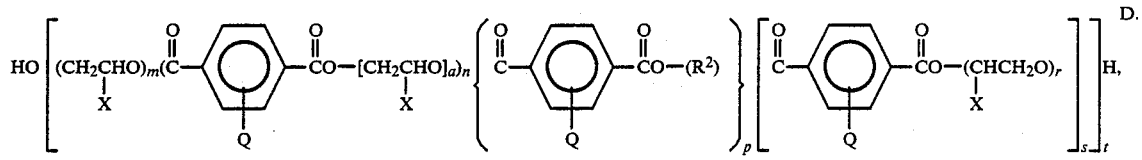

for example

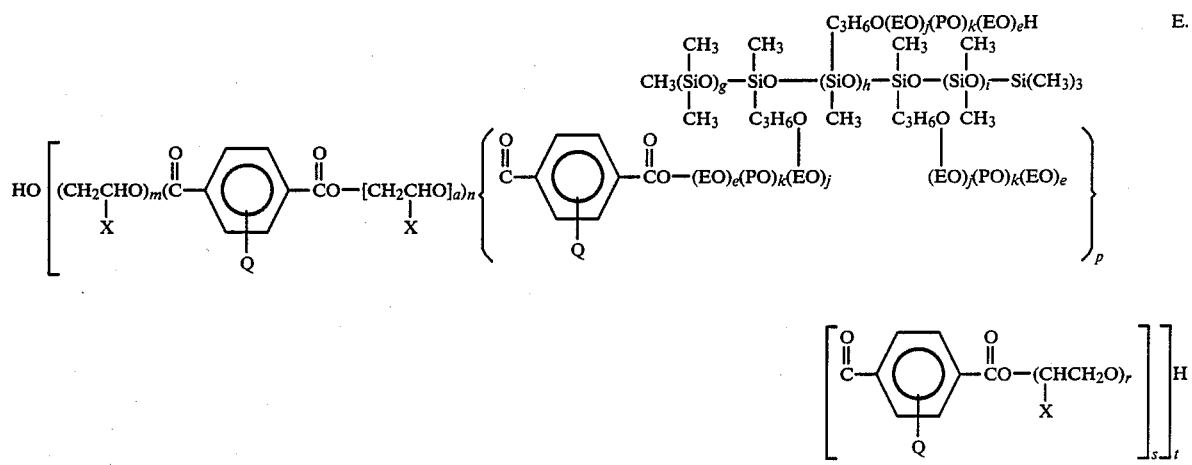

wherein
m and s each have a value of from 1 to 200,
n and p each have a value of from 1 to 5,
a and r each have a value of from 0 to 10,
t has a value of from 1 to 50
$R^2$ represents component (c) above and,
X, Z, Z', and O are as described above.

The polymeric compounds of this invention are prepared by reacting

A. a polyalkylene glycol containing units having the structure of component (a), namely

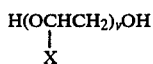

wherein v has a value of from 3 to 200

B. a benzene polycarhoxylic acid, ester or anhydride thereof containing a unit corresponding to the structure of component (b) and defined by the formula

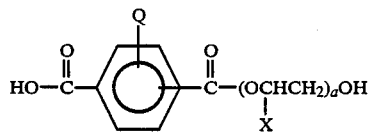

wherein (a) has a value of from 0 to 10, and

C. a siloxane containing a unit corresponding to the structure of component (c) namely,

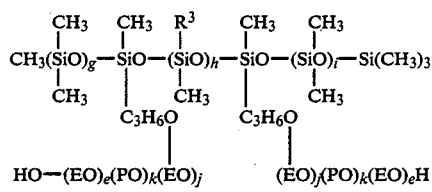

at a temperature between about 135° C. and about 230° C. for a period of from about 3 to about 15 hours with good agitation. The reaction can be effected under a pressure of from about atmospheric to about 50 psia. employing a nitrogen sparge to provide anhydrous conditions. Preferred reaction conditions include a temperature of between about 160° C. and about 220° C. under atmospheric pressure for a period of from about 5 to about 8 hours.

Suitable examples of reactant B include substituted or unsubstituted reactants of phthalic and trimellitic acids, the mono- or poly- ethoxylated or mono- or poly- propoxylated esters thereof or phthalic or trimellitic anhydrides. Preferred of this group are optionally alkoxylated terephthalic acids which may or may not be substituted.

Reactants A, B and C can be contacted in the absence of diluent or solvent. However, if desired, the reactants can be mixed together and reacted in an organic medium of which benzene, toluene, cyclohexane, etc. may be employed as suitable inert diluents. Accordingly, the reactive species are present in the reaction mixture in a concentration of between about 30 and about 100 wt. %. Alternatively, the siloxane can be pre-reacted with reactant B and the polyalkylene glycol or polyalkylene glycol polymer added subsequently.

The mole ratio of components A to B can vary between about 0.5:1 to 1.5:1 and the mole ratio of component B to C can vary between about 0.5:1 to 1.5:1; although it is preferred to use a ratio of A:B:C from about 0.8:1:0.2 to about 0.5:1:0.5. Generally, it is expedient to employ at least one molar equivalent of reactant C for each hydroxy group in reactant B.

The product of the process forms as a waxy solid which is subsequently flaked or ground. The particulates can be used directly or can be homogenized in an aqueous dispersion or in a suitable inert solvent at between about 1000 and about 4000 psi in a concentration of from about 15% to about 40% by weight. The flaked product can be employed in a dry state e.g. in a granulated detergent system as the sole soil release, softening and antistatic agent. The homogenized product, in a liquid carrier such as water, benzene, mineral oil, linseed oil etc., can be added to liquid formulations used in cosmetics as in skin creams, lotions and gels, skin and hair shampoos, upholstery and rug shampoos, cream rinses and mousses as well as industrial uses. Thus, the products of the present invention can be formulated as dry powder with an inert carrier such as clay, talc, montmorillonate, and used directly as a detergent in a washing cycle as the sole soil release and softening agent or it can be formulated into an existing detergent which includes any of the commercial powders or liquids used for launderingfabrics or for industrial cleaning. Generally the concentration of the present product in an inert carrier, a commercial liquid formulation or a dry particulate formulation is between about 0.01% and about 10% by weight; although for spot removal and heavy soil more concentrated mixtures up to about 50 wt. % can be applied as an aqueous composition.

The present products can also be employed in the rinse water after laundering where soft hand and antistatic properties are desired after subsequent drying. The fabric so treated retains anti-soil deposition properties imparted to it by the present compounds. Aqueous suspensions of the oresent products can also be applied to textile fibers, fabrics and plastics as lubricants which resist yellowing. Accordingly, a thin continuous or non-continuous film of from about 0.5 mils to about 1.5 mil thickness can be applied to the surface of a fabric, fiber or plastic material to minimize static build-up and to lubricate during machining, cutting or other processing. Methods of application such as padding, rolling, spraying, exhaustion etc. are well known in the art. Typical laundry detergent formulations to which the present compounds are added include:

SOLID

| Material | % |
|---|---|
| SOLID | |
| Neodol 25-7* | 15.0 |
| Sodium tripolyphosphate | 40.0 |
| Sodium metasilicate pentahydrate | 5.0 |
| Carboxymethyl cellulose | 1.0 |
| Sodium Sulfate | 29.0 |
| Sodium Carbonate | 5.0 |
| Compound example | 5.0 |
| LIQUID | |
| Neodol 25-7* | 20.0 |
| Lauric diethanolamide | 5.0 |
| Cetyl Betaine | 5.0 |
| Compound example | 5.0 |
| Water | 65.0 |

*A $C_{12}$—$C_{15}$ linear primary alcohol ethoxylate

Having thus generally described the invention, reference is now had to the accompanying examples which illustrate preferred embodiments and which compare the present compounds with other leading commercial products. However, these examples are not to be construed as limiting to the scope of the invention as more broadly set forth above and in the appended claims.

Examples 1 through 12 describe the preparation of the present compounds according to the reaction of Reactant A + Reactant B + Reactant C, i.e.

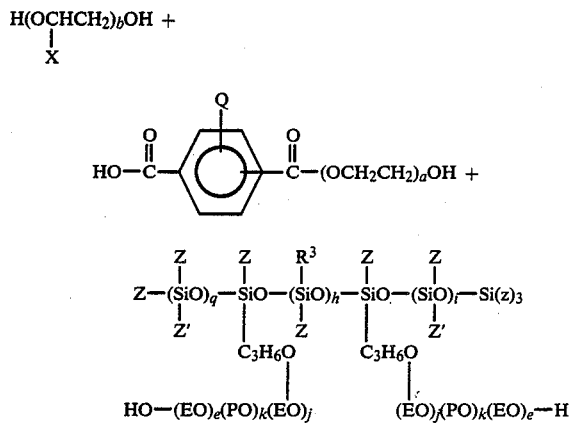

EXAMPLES 1–12

To a three necked round bottom glass flask equipped with a thermometer, nitrogen spage, and dean stark trap, was added the quantity of reactants as shown in Table I. The contents of the flask was then heated to 210° C. and distillation of water by-product began as the reaction reaches 140° C. The reaction mixture was held at 210° C. for 6 hours after which distillation of generated water by-product ceased. The resultant product was a mixture containing compounds conforming to formula D above. The specific reactants and amounts employed are as set forth in following Table I.

TABLE I

| Example No. | X/b of Reactant A | Grams of Reactant A | a/Q of Reactant B | Grams of Reactant B | $R^3$, Z & Z', g, h, i, j, k & e of Reactant C | Grams of Reactant C |
|---|---|---|---|---|---|---|
| 1 | H/70 | 2680 | 0/H | 167 | —$C_3H_6O(EO)_{25}H$, —$CH_3$, —$CH_3$, 1, 0, 0, 0, 0, 25 | 457.8 |
| 2 | 50-50 mix of H & $CH_3$/150 | 6,180 | 0/50-50 mix of H & $SO_3Na$ | 218 | —$C_3H_6O(PO)_{25}$, —$CH_3$, —$CH_3$, 100, 0, 0, 0, 25, 0 | 2,370 |
| 3 | $CH_3$/57 | 2,690 | 0/H | 167 | —$C_3H_6O(EO)_{50}(PO)_{25}(EO)_{50}$, —$CH_3$, —$CH_3$, 5, 0, 0, 50, 25, 50 | 2,439 |
| 4 | H/200 | 7,040 | 5/H | 774 | —$CH_3$ —$CH_3$, —$CH_3$, 20, 0, 0, 0, 0, 0, | 356 |
| 5 | H/100 | 3,520 | 0/50-50 mix of $SO_3Na$ & COOH | 1400 | —$C_3H_6O(EO)_{10}(PO)_{10}(EO)_{25}$, —$CH_3$, —$CH_3$, 1, 50, 10, 10, 10, 25 | 23,067.8 |
| 6 | H/3 | 105.6 | 0/H | 167 | —$C_3H_6O(EO)_{50}$, —$CH_3$, —$CH_3$, 100, 50, 5, 50, 0, 0 | 25,484 |
| 7 | H/100 | 3,250 | 0/COOH | 211 | —$C_3H_6O(EO)_{50}(PO)_{25}$, —$CH_3$, —$CH_3$, 5, 50, 10, 25, 0 | 39,207 |
| 8 | $CH_3$/50 | 1,760 | 0/H | 167 | —$C_3H_6O(EO)_{10}$, —$CH_3$, —$CH_3$, 20, 50, 0, 10, 0, 0 | 5,666 |
| 9 | $CH_3$/3 | 141.6 | 10/$SO_3Na$ | 1214 | —$C_3H_6O(EO)_{25}$, —$CH_3$, —$CH_3$, 1, 100, 10, 0, 0, 25 | 24,106 |

TABLE I-continued

| Example No. | X/b of Reactant A | Grams of Reactant A | a/Q of Reactant B | Grams of Reactant B | $R^3$, Z & Z', g, h, i, j, k & e of Reactant C | Grams of Reactant C |
|---|---|---|---|---|---|---|
| 10 | H/3 | 105.6 | 0/H | 167 | $-C_3H_6O(EO)_{25}(PO)_{10}(EO)_{25}$, $-CH_3$, $-CH_3$, 100, 100, 5, 25, 10, 25 | 60,270 |
| 11 | $CH_3$/100 | 4,720 | 10/COOH | 9,520 | $-C_3H_6O(EO)_5(PO)_{10}(EO)_5$, $-CH_3$, $-CH_3$, 5, 100, 10, 5, 10, 5 | 22,749 |
| 12 | 50-50 mix of H & $CH_3$ | 4,120 | 5/H | 7,740 | $-C_3H_6O(PO)_5(EO)_{25}$, $-CH_3$, $-CH_3$, 20, 100, 0, 0, 5, 25 | 29,294 |

The following data compares the softening and soil release properties of the present compounds with the foremost commercially available products.

EXAMPLES 13 TO 21

A. Stain Removal Test

In the following tests 12×12 inch samples of white polyester fabric were placed on a blotting paper and stained with 5 drops of an equal mixture of Nujol oil, Wesson oil, butter and mustard. A glassine paper was placed over the soiled area and a 5 lb. weight applied over the paper for 60 seconds. The samples were then placed in a washing machine filled with water to the high water level at a temperature of 140° F. One sample was employed as a control in the washing procedure. The remaining samples were treated with various soil release agents as noted in the following Table by adding 140 grams of the test material to the water. The samples were then washed in a Sears Kenmore washing machine under normal setting for 12 minutes/cycle which included washing, rinsing and spin drying. The washing cycle for each sample was repeated 5 times. After the last wash the samples were dried at 160° F. for 45 minutes and residual stains evaluated 4 hours after drying by placing the samples on a black table top and observing discoloration. The test materials were evaluated on a scale of from 1 to 5 where 5 represents substantially complete removal. The results of these tests are reported in the following Table II.

TABLE II

| Example | Product Tested | Wt. & Prod. Employed | Soil Release (i) | | Softening | |
|---|---|---|---|---|---|---|
| | | | 0 Washes | 5 Washes | 0 Washes | 5 Washes |
| 13 | Control | No treatment | none | none | none | none |
| 14 | QCJ (ii) | 0.5 | 4 | 4 | 1 | 2 |
| 15 | HPA (iii) | 0.5 | 3 | 3 | 2 | 1 |
| 16 | Stearyl dimethyl ammonium chloride | 0.5 | 1 | 1 | 4 | 1 |
| 17 | MILASE T (iv) | 0.5 | 4 | 3 | 2 | 1 |
| 18 | Prod. of Example 1 | 0.5 | 4 | 4 | 4 | 4 |
| 19 | Prod. of Example 5 | 0.5 | 3 | 3 | 4 | 4 |
| 20 | Prod. of Example 9 | 0.5 | 4 | 3 | 3 | 3 |
| 21 | Prod. of Example 12 | 0.5 | 4 | 5 | 5 | 4 |

(i) soil is a mixture of Nujol oil, butter, Wesson oil and mustard
(ii) same as (iv) except MW = 30,000
(iii) 50% (iv) + 50% 1,4-benzene dicarboxylate sulfonic acid sodium salt
(iv) 1,4-benzenedicarboxylic acid polymer with 1,2-ethane diol and -hydro-w-hydroxypoly (oxy-1,2-ethanediyl) MW = 15,000

As shown above the standard soil release polymers (Examples 14 to 15) possess good soil properties, however they provide little or no softening effect. On the other hand, ammonium chloride, a softener commonly employed, provides no soil release. Furthermore, it was found that the softening properties of this compound last for only one wash; whereas the compounds of the present invention give good soil release and enduring softening properties for several washes.

EXAMPLES 22 TO 28

Yellowing on Textiles

The following compounds were compared for degree of yellowing on 6"×6" swatches of cotton/polyester (50/50) fabric. The individual compounds for testing were prepared by forming 1% solutions in water and applied to the swatches by dipping them in the solution at room temperature. The swatches are drained dry and subjected to the color fastness heat test using a 200° C. hot iron applied to the fabric for 60 and 180 seconds according to the AATCC Test Method 117-1979. The degree of yellowing was rated on a scale of 1 to 5, a value of 2 or 1 being negligible. The results of these tests are as reported in following Table III.

TABLE III

| Example # | Test Compound | Degree of Yellowing | |
|---|---|---|---|
| | | After 60 secs. | After 180 secs. |
| 22 | Product of Ex. 2 | 4 | 4 |
| 23 | Product of Ex. 4 | 4 | 4 |
| 24 | Product of Ex. 6 | 5 | 5 |
| 25 | Product of Ex. 10 | 4 | 4 |
| 26 | Distearyl-dimethyl ammonium chloride | 2 | 2 |
| 27 | Product of Ex. 3 | 1 | 1 |
| 28 | Product of Ex. 7 | 2 | 2 |

EXAMPLES 29-43

Aqueous solutions containing 0.5 wt. % of Examples 1 to 10 were exhaustef onto a polyester fiber at 170° F. The sample was dried and conditioned in 45% relative humidity at 70° F. for 24 hours. The coefficient of friction between the fiber and a 316 stainless steel pin was determined by a Rothchild friction tester. The results of these tests are reported in following Table IV.

TABLE IV

FRICTIONAL PROPERTIES
LUBRICATION DATA
Coefficient of Friction

| Ex. No. | Product Tested | FIBER/METAL | |
|---|---|---|---|
| | | 100 | 300 |
| | | (m/min) | |
| 30 | Butyl Stearate | 0.17 | 0.21 |

TABLE IV-continued
FRICTIONAL PROPERTIES LUBRICATION DATA
Coefficient of Friction

| Ex. No. | Product Tested | FIBER/METAL 100 (m/min) | 300 (m/min) |
|---|---|---|---|
| 31 | Hexadecyl Stearate | 0.18 | 0.23 |
| 32 | Tridecyl Stearate | 0.25 | 0.27 |
| 33 | Dimethyl polysiloxane | 0.06 | 0.01 |
| 34 | Product of Example 1 | 0.31 | 0.34 |
| 35 | Product of Example 2 | 0.29 | 0.33 |
| 36 | Product of Example 3 | 0.27 | 0.30 |
| 37 | Product of Example 4 | 0.27 | 0.28 |
| 38 | Product of Example 5 | 0.25 | 0.29 |
| 39 | Product of Example 6 | 0.27 | 0.28 |
| 40 | Product of Example 7 | 0.27 | 0.29 |
| 41 | Product of Example 8 | 0.27 | 0.32 |
| 42 | Product of Example 9 | 0.25 | 0.35 |
| 43 | Product of Example 10 | 0.28 | 0.29 |

The novel compounds are highly substantive to the polyester fiber and exhibit high performance as lubricants during processing.

What is claimed is:

1. A silicone polyester polyol containing
   (a) a $C_2$ to $C_3$ alkyleneoxy unit
   (b) a benzene carbonyloxy unit and
   (c) a siloxane unit having the formula

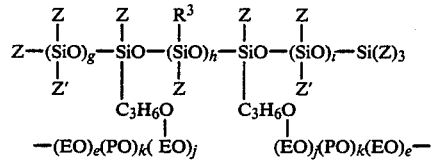

wherein Z and Z' are each —$CH_3$, —$C_2H_5$ or mixtures therefore;
$R^3$ is Z or —$C_3H_6O(EO)_j(PO)_k(EO)_e$
EO is —$CH_2CH_2O$—
PO is $$-CH_2CHO- \atop |\atop CH_3$$

g has a value of from 1 to 150
h and i each have a value of from 0 to 100
j and e each have a value of from 0 to 100 and k has a value of from 0 to 50.

2. The polyol of claim 1 wherein g has a value of from 5 to 100; i has a value of from 0 to 10; j and e each have a value of from 1 to 50 and k has a value of from 0 to 25.

3. The polyol of claim 1 wherein the compound contains
from 3 to 425 units of component a;
from 1 to 40 units of component b and
from 1 to 12 units of component c.

4. The polyol of claim 3 wherein the compound contains from 3 to 400 units of component a; from 3 to 25 units of component b and from 1 to 10 units of component c.

5. The polyol of claim 1 wherein Z and Z' are both methyl.

6. The polyol of claim 1 having the formula

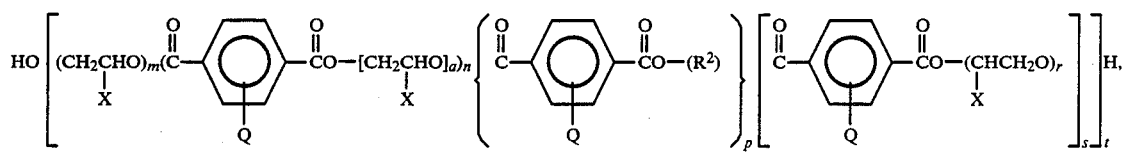

wherein
$R^2$ is said siloxane unit; Q is H, $SO_3M$, COOH or COOM where M is Na, K or $NH_4$
X is H, $CH_3$ or mixtures thereof
m and s each have a value of from 1 to 200
n and p each have a value of from 1 to 5
a and r each have a value of from 0 to 10 and
t has a value of from 1 to 50.

7. The polyol of claim 2 having the formula

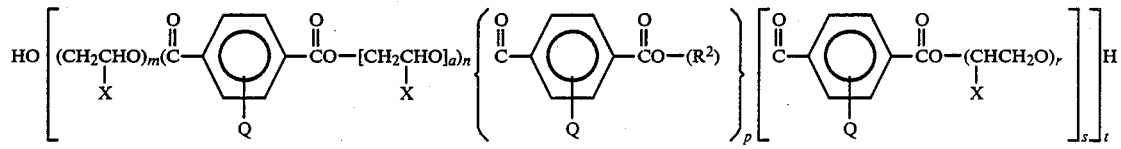

wherein X is —H, —$CH_3$ or a mixture thereof;
Q is —H, —$SO_3M$, COOH or COOM where M is Na, K or $NH_4$;
$R^2$ is said siloxane unit;
a and r each have a value of from 0 to 10;
m and s each have a value of from 1 to 200;
n and p each have a value of from 1 to 5 and
t has a value of from 1 to 50.

8. The polyol of claim 6 having the formula

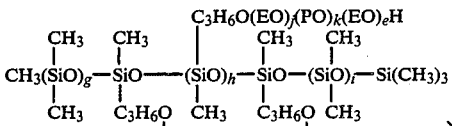
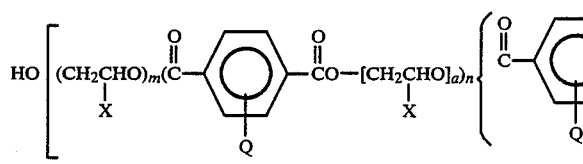
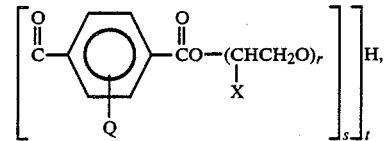

9. The polyol of claim 7 having the formula

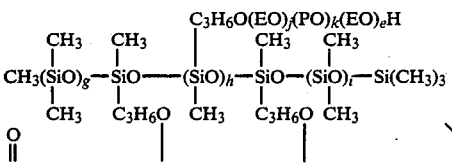
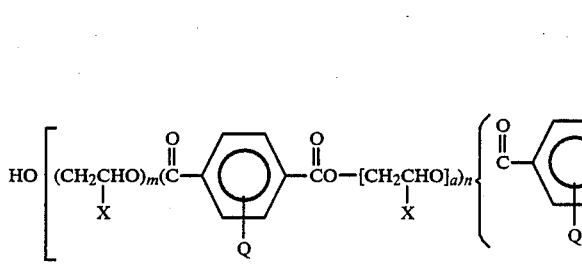
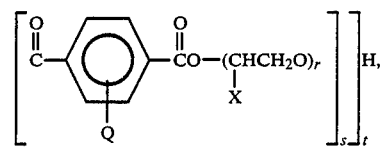

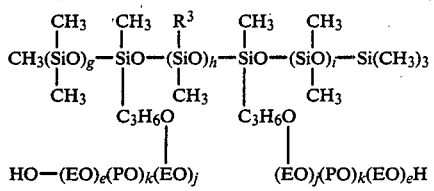

10. The process for synthesizing the polyol of claim 1 which comprises reacting, under anhydrous conditions, a polyalkylene glycol having the formula,

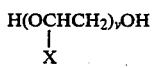   A.

wherein v has a value of 3 to 200 and X is H, —CH$_3$ or a mixture thereof, a benzene polycarboxylic acid, or an ester or anhydride thereof having the formula,

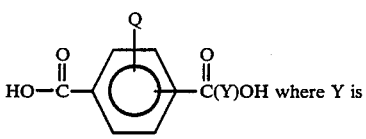   B.

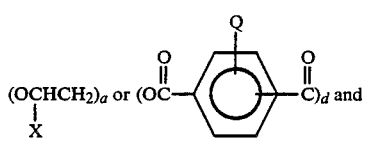

wherein (a) has a value of from 0 to 10 and (d) has a value of from 0 to 1, and a siloxane having the formula, at a temperature between about 135° and about 230° C., under a pressure from about atmospheric to about 50 psia for a period of from about 3 to about 15 hours optionally in the presence of an inert organic diluent.

11. The process of claim 10 wherein the concentration of said reactants in the reaction mixture is between about 30% and about 100% by weight.

12. The process of claim 10 wherein said process is effected at a temperature of between about 160° and about 220° C. under atmospheric pressure for a period of from about 5 to about 8 hours.

13. The process of claim 10 wherein the mole ratio of reactant A to reactant B is between about 0.5:1 and about 1.5:1 and the mole ratio of reactant B to reactant C is between about 0.5:1 and about 1.5:1.

14. The process of claim 10 wherein said product is reduced to particulate form and is intimately mixed in an inert liquid carrier to form a uniform liquid mixture containing between about 15% and about 50% by weight.

15. The process of claim 14 where said product is homogenized with said carrier under a pressure of from about 1000 to about 4000 psi.

* * * * *